Patented Oct. 24, 1944

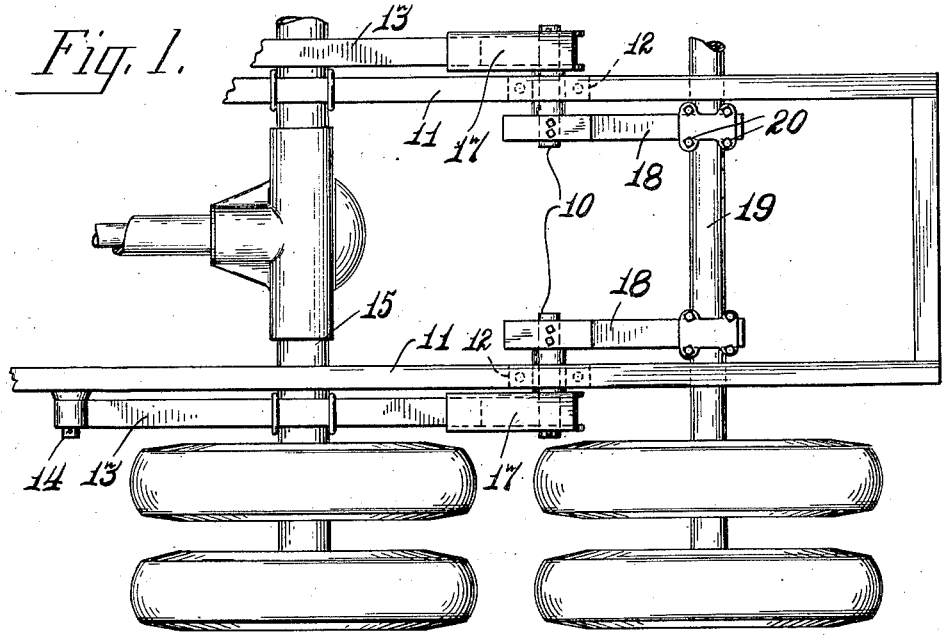
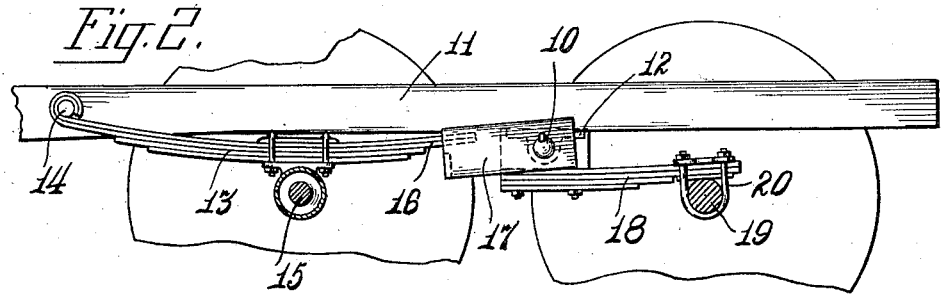
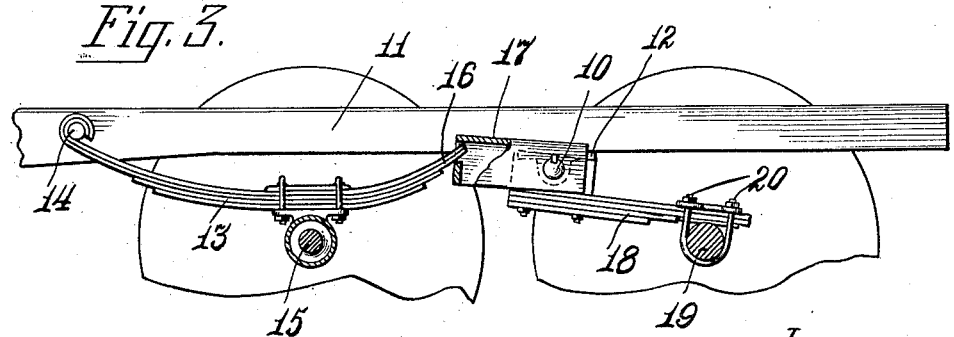

2,361,323

UNITED STATES PATENT OFFICE 2,361,323

VEHICLE

Joseph P. Seghers, Portland, Oreg.

Application July 26, 1943, Serial No. 496,125

5 Claims. (Cl. 280—104)

The invention relates to improvements in vehicles and has for its primary object the provision of an improved vehicle construction especially adapted to the carrying of heavy loads.

Other objects will appear hereinafter.

The invention consists of the combinations and arrangements of parts hereinafter described and claimed.

The invention will be best understood by reference to the accompanying drawing forming a part of this specification and in which—

Fig. 1 is a partial plan view of the rear portion of a wheeled vehicle embodying the invention;

Fig. 2, a partial longitudinal section of the same showing the positions of the parts under load; and Fig. 3, a view similar to Fig. 2 but showing the positions of the parts when not under heavy load.

The embodiment of the invention illustrated in the drawing comprises two rocker shafts 10 mounted as shown on the under sides of the side bars 11 of a wheeled vehicle immediately to the rear of the rear axle thereof, said rocker shafts being mounted in suitable bearings 12 as indicated. The ordinary side springs 13 of the vehicle which are pivoted at 14 to the vehicle frame and secured as indicated to the rear axle 15 thereof, have their rear ends 16 slightly shortened and slideably engaged with a corresponding rocker arm 17 on the corresponding rocker shaft 10, as indicated. Each rocker shaft 10 carries at its inner end a rearwardly extending spring rocker arm 18 rigidly secured thereto, and also secured to a supplemental auxiliary axle 19 by means of the clevises 20. By this arrangement a part of the load on the main springs 13 is transmitted upwardly against the rocker arms 17, thus causing downward pressure on the spring rocker arms 18, and correspondingly on the auxiliary or supplemental axle 19, and whereby a part of the load or strain on the ordinary rear axle is transmitted and borne by the supplemental; and the proportion of load thus carried by the supplemental axle may be varied by varying the lengths of the rear portions of the springs 13, the shorter said rear portions, the more of the load transmitted to the supplemental axle. As will be observed, the springs 18 are located inside of the frame 11, thereby permitting comparatively great lateral yielding in lifting and twisting between wheels and frame, thus affording great resiliency and shock-absorbing properties to the arrangement.

The specific form and arrangement of parts disclosed is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. The combination with the side springs of a vehicle, of a rocker shaft mounted on the sides of the vehicle frame adjacent the rear ends of said springs; a forwardly extending rocker arm in the form of an inverted channel rigidly connected with each rocker shaft and loosely engaging the rear end of the corresponding side spring; a rearwardly extending rocker arm on each rocker shaft; and an auxiliary wheeled axle carried by said rearwardly extending rocker arms.

2. The construction specified in claim 1 in which the forwardly extending rocker arms are rigid and the rearwardly extending rocker arms are springs.

3. The combination with a vehicle having side springs, of two transverse rocker shafts on the under sides of the side bars of the vehicle frame, each carrying at its outer end one rocker arm connected with the corresponding side spring and at its inner end another rocker arm extending rearwardly therefrom; and a supplemental wheeled axle operatively connected with said rearwardly-extending rocker arms.

4. The combination with a vehicle having side springs and a frame having side bars, of two rocker shafts mounted on the under sides of said side bars, a rocker arm at the outer end of each rocker shaft and extending forwardly and operatively connected with the corresponding side spring; a rearwardly extending rocker arm on the inner end of each rocker shaft; and a supplemental wheeled axle operatively connected with said last mentioned rocker arms.

5. The construction specified in claim 4 in which the forwardly extending rocker arms are rigid and the rearwardly extending rocker arms are springs.

J. P. SEGHERS.